United States Patent Office 3,167,927
Patented Feb. 2, 1965

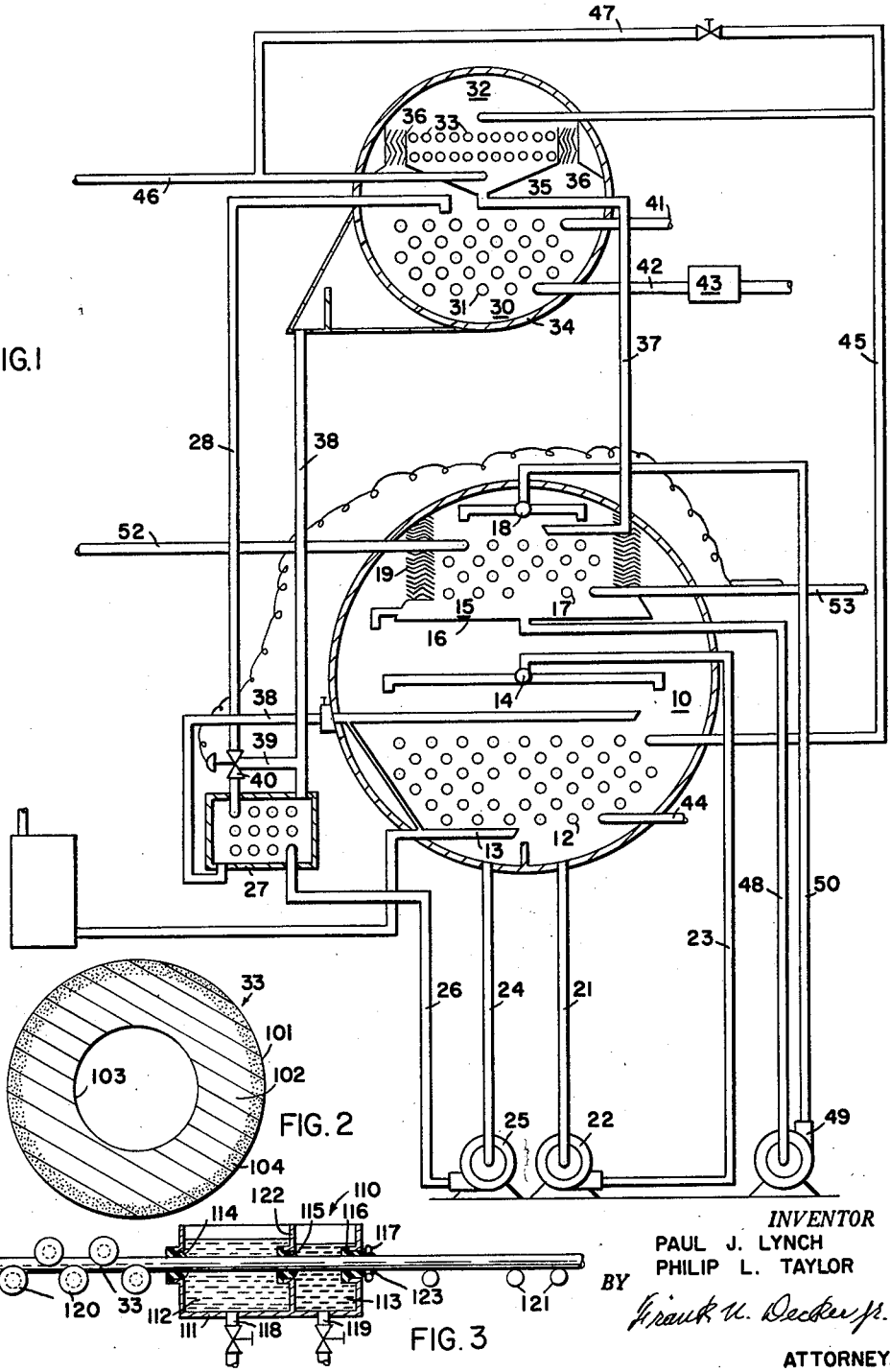

3,167,927
PROMOTION OF DROPWISE CONDENSATION
Paul J. Lynch, East Syracuse, and Philip L. Taylor, Schenectady, N.Y., assignors to Carrier Corporation, a corporation of Delaware
Filed June 23, 1961, Ser. No. 119,169
3 Claims. (Cl. 62—56)

This invention relates to the promotion of dropwise condensation and more particularly to the promotion of dropwise condensation in absorption or other refrigeration systems, or other apparatus utilizing condensers.

An apparatus of the type to which this invention relates operates by providing a body having one surface in contact with a condensible vapor and another surface in contact with a cooling fluid. The vapor is condensed by removal of heat from the vapor by a cooling fluid.

A typical example of an apparatus which may embody this invention is a shell and tube type refrigerant condenser of an absorption refrigeration machine. The condenser comprises a shell having a plurality of hollow heat exchange tubes therein through which a cooling fluid such as water is passed. Refrigerant vapor is passed over the exterior surface of the heat exchange tubes in the shell of the condenser. Heat passes from the relatively high pressure refrigerant vapor through the body of the heat exchange tubes to the relatively cool fluid passed through the interior of the tubes. The cooling of the refrigerant vapor results in condensing liquid refrigerant on the surfaces of the heat exchange tubes in the condenser.

Since in a condenser of the type described, heat must pass from the vapor on one side of the condenser body or tube to the cooling fluid on the other side of the condenser body or tube, it will be apparent that anything on or at the condensing surface of the body which inhibits heat transfer by offering additional thermal resistance reduces the efficiency of the condenser. Consequently, as thermal resistance is added to the passage of heat to the cooled body of the condenser, the size of the condenser must be made larger or the temperature differential across its surface must be made greater in order to provide a given amount of condensing under a given set of conditions, thereby increasing the cost of the condensing system.

One of the long recognized disadvantages of a typical shell and tube condenser has been that the condensing vapor forms a liquid film on the condensing surface of the heat exchange tubes thereby inhibiting heat transfer and reducing the heat transfer coefficient of the condenser. If the vapor can be made to condense in dropwise fashion on the condensing surface so that discrete droplets of liquid form on the exterior of the heat exchange surface, the area of the surface between the droplets will be free of liquid film and in direct contact with the condensible vapor. Under these circumstances, substantially all of the surface of the condenser will at all times be in contact with the vapor to be condensed, except for the small regions thereof on which the droplets form. As the droplets form they quickly drain from the condensing surface of the tube thereby exposing more surface to the vapor for condensation to take place. Stated in another way, if dropwise condensation of the condensible vapor is promoted on the surface of a heat exchange body, the formation of a thermally insulating film of liquid on the surface of the body is retarded or substantially prevented and the heat transfer coefficient and condensing efficiency are greatly improved, resulting in material cost savings.

Attempts have been made to coat organic compounds on the surface of condensers in an attempt to promote dropwise condensation thereon. While the use of these compounds is temporarily successful in providing dropwise condensation, the results have not been satisfactory for the reason that the mechanically held surface coatings tend to be stripped from the condenser surface after a relatively short period of time, and thereafter, the surface begins to develop a film of condensing liquid which inhibits heat transfer and reduces the efficiency of the condenser. Furthermore, it has been observed that mixed film and dropwise condensation begins to occur on the condensing surface shortly after the beginning of operation of a condenser treated with such compounds as oleic acid to promote dropwise condensation. It has further been observed that mixed film and dropwise condensation provides even a lower heat transfer coefficient or condenser efficiency than either film condensation alone or dropwise condensation alone. Consequently, the use of previously known coating materials has proved unsatisfactory in improving the performance of condensers for more than short periods of time and they must be replaced at frequent intervals.

If, however, a permanent and effective chemically adherent dropwise condensation promoter is provided on the surface of a condenser tube or other body, it is apparent that great economic savings can result. Since the condensing efficiency or heat transfer coefficient of a condenser wherein the vapor condenses in dropwise fashion is greatly increased over that of a condenser wherein the vapor condenses either as a film or as mixed drops and film, the size of the condenser and the amount of heat exchange surface therein may be greatly reduced. Alternatively, a condenser of a given size may condense a substantially greater amount of vapor for a given temperature difference between the vapor and cooling fluid when the vapor is made to condense in dropwise fashion. Also, in a given condenser the temperature difference between the cooling fluid and the condensible vapor may be greatly reduced if the vapor is made to condense in a dropwise fashion on the condenser surfaces.

Accordingly, it is the principal object of this invention to provide an improved method and means for promoting dropwise condensation on a condenser surface.

It is a further object of this invention to provide an improved method for coating a heat exchange surface to promote dropwise condensation thereon.

These and other objects of this invention are achieved in the illustrated preferred embodiment thereof by providing a heat exchange surface, such as a copper heat exchange tube, having a mercurous coating thereon in a refrigerant condenser. The mercurous coating may comprise an amalgam of mercury and copper on the condensing surface of a heat exchange tube. The precise mechanism and function of the mercurous coating present on the surface of the tube which promotes dropwise condensation is not fully understood and mercurous oxide or mercuric oxide may be present on the surface of the heat exchanger and may aid in the promotion of dropwise condensation thereon. In any event, the mercurous coating serves to reduce the surface tension of the condensing surface below that of the liquid being condensed so that the surface tension of the condensed liquid overcomes the surface tension of the surface and causes the liquid to coalesce into discrete droplets on the condensing surface. The resulting condensing surface provides relatively permanent dropwise condensation characteristics due to the chemical-like bond formed between it and the body of the condenser.

A suitable surface for the condensation of water vapor may be prepared by cleaning a copper tube with nitric acid and thereafter wiping the surface of the tube with mercury to form a mercury amalgam on the surface of the tube.

These and other objects of this invention will become more apparent with reference to the following specification and drawing wherein:

FIGURE 1 illustrates an absorption refrigeration machine having a refrigerant condenser constructed in accordance with this invention;

FIGURE 2 shows a cross section through a condenser tube having a mercurous coating thereon; and FIGURE 3 illustrates a method of preparing a condenser surface having a mercurous coating thereon for the promotion of dropwise condensation.

Referring particularly to the drawing, there is shown an absorption refrigeration machine comprising an absorber section 10 within a shell 11. A plurality of heat absorber exchange tubes 12 are provided within the absorber section. A purge line 13 leads from a suitable region of the absorber and serves to conduct noncondensible gases therefrom to a suitable purge unit. A spray system 14 is located above the absorber section.

Also disposed in shell 11 is an evaporator section 15 comprising a pan-like member 16 within which is disposed a plurality of evaporator heat exchange tubes 17. A spray system 18 is located above heat exchange tubes 17. A plurality of eliminators 19 are provided to prevent escape of entrained refrigerant from evaporator section 15 to absorber section 10.

Line 21 is connected to recirculation pump 22 and serves to forward absorbent solution of intermediate strength from the lower portion of absorber section 10 through line 23 to spray system 14 in order to recirculate absorbent solution to the absorber. A line 24 leads from a lower portion of absorber section 10 containing weak solution and solution pump 25 serves to pass the weak solution through line 26, solution heat exchanger 27, through line 28, to generator section 30.

As used herein, the term "strong solution" refers to an absorbent solution strong in absorbing power and the term "weak solution" refers to absorbent solution weak in absorbing power. The term "intermediate strength solution" refers to a solution having a concentration intermediate that of strong solution and weak solution.

A suitable absorbent for a refrigeration system of the type described is a solution of lithium bromide and water. The concentration of the strong solution leaving the generator may be about 65%. A suitable refrigerant is water.

Generator section 30 is located in shell 34 and comprises a plurality of generator heat exchange tubes 31 for passing steam. Also located within shell 34 is condenser section 32 comprising a pan-like member 35 within which are disposed a plurality of condenser heat exchange tubes 33 for passing cooling water. Eliminators 36 are provided to prevent absorbent solution from being entrained in refrigerant vapor passed from generator section 30 to condenser section 32.

A line 37 leads from pan-like member 35 to evaporator section 15 and serves to return condensed refrigerant from the condenser section to the evaporator section. Line 38 extends from generator section 30 through solution heat exchanger 27 to absorber section 10 and serves to return hot, strong absorbent solution from the generator section to the absorber section while passing it in heat exchange relation with cool, weak solution being forwarded to the generator for concentration thereof.

A bypass line 39 and bypass valve 40 having a suitable actuator mechanism may be provided for capacity control of the refrigeration system. Reference is made to Leonard application Serial No. 2,203, filed January 13, 1960, now Patent No. 3,054,272, for a complete description of the operation of an absorption refrigeration machine including the operation of bypass line 39 and bypass valve 40.

A steam inlet line 41 and outlet line 42 having suitable steam trap 43 is provided to admit steam to heat exchange tubes 31 in order to boil off refrigerant vapor from weak solution supplied to the generator in order to concentrate the weak solution. It will be understood that the vaporized refrigerant passes through eliminators 36 and is condensed in condenser 32. A cooling water inlet line 44 is connected to heat exchange tubes 12 in absorber section 10 from which the cooling water passes through line 45 to condenser heat exchange tubes 33. The cooling water is then discharged through line 46 and an appropriate bypass line and valve 47 may be provided to bypass cooling water around the condenser section, if desired. The cooling water serves to remove the heat of dilution and condensation from the absorbent solution in absorber section 10 and serves to remove the heat of vaporization to condense refrigerant vapor in condenser section 32.

A suitable recirculation line 48 and recirculation pump 49 pass refrigerant from pan 16 of the evaporator section through line 50 to spray system 18 so that refrigerant may be sprayed over evaporator heat exchange tubes 17 to wet them and aid in cooling of the heat exchange tubes by evaporation of refrigerant. Lines 52 and 53 serve to conduct a heat exchange fluid, which is cooled by passage through heat exchange tubes 17 and the resulting heat exchange with the cooled refrigerant, to suitable remotely located heat exchangers to provide cooling at the desired regions.

While the utility and operation of this invention will be described with particular reference to an absorption refrigeration system, it is to be understood that this invention may be used with other types of refrigeration systems or other apparatus such as steam turbine condensers.

In operation, the absorption refrigeration system is purged of air or noncondensible gases. Refrigerant in evaporator section 15 vaporizes due to the low pressure in vessel 11. The vaporized refrigerant is absorbed into the absorbent solution in absorber section 10 thereby diluting the solution. Weak absorbent solution is passed through lines 26 and 28 to the generator section for reconcentration thereof. Steam is supplied through line 41 to generator section 30 to provide heat to boil refrigerant from the solution passed to the generator section. This vaporized refrigerant passes through eliminator 36 where it contacts the exterior surfaces of condenser heat exchange tubes 33.

Cooling water is passed through absorber tubes 12 to remove the heat of dilution and heat of condensation from the absorbent solution from which the cooling water is passed to line 45 and through the interior of condenser heat exchange tubes 33. The cooling water on the interior of the condenser heat exchange tubes absorbs heat from the refrigerant vapor which contacts their exterior surfaces and causes the refrigerant vapor to condense. The condensed refrigerant drains from the tubes and is collected in pan 35 and passed through line 37 back to evaporator section 15 for revaporization thereof. Refrigerant evaporating in evaporator section 15 absorbs heat from the heat exchange fluid flowing through the evaporator heat exchange tubes 17 to provide the desired cooling effect. The cooled heat exchange fluid may then be passed to a desired remote location for cooling of the region to be conditioned.

It will be seen from this explanation that a substantial amount of heat exchange surface must be provided in condenser section 32 in order to provide the required condensation of refrigerant on the exterior surfaces of condenser heat exchange tubes 33. In order to minimize the over-all cost of the absorption refrigeration machine, it is desirable to provide an efficient condenser having a high rate of heat transfer. As has been previously explained, a relatively high coefficient of heat transfer may be obtained in condenser section 32 by promoting dropwise condensation therein. Accordingly, the exterior surfaces of heat exchange tubes 33 are prepared in accordance with this invention to provide a surface thereon which promotes dropwise condensation.

FIGURE 2 shows a cross section through one of the heat exchange tubes 33 in condenser section 32. Condenser tube 33 has an exterior surface 101, a body portion 102, and an interior surface 103. In operation of the refrigeration system, refrigerant vapor contacts exterior surface 101 which is cooled by passing cooling fluid through the interior of the tube. The heat of the vaporization of the vapor is conducted from the exterior surface of the tube through the body portion 102 to interior surface 103 where the heat is given up to the cooling fluid passing through the interior of condenser tube 33.

In order to promote dropwise condensation of the refrigerant on the exterior surface of heat exchange tube 33, a relatively thin layer 104 of a mercurous compound may be formed on the exterior condensing surface of the tube. This layer preferably extends radially inwardly from the exterior surface 101 about 5–25 percent of the thickness of body region 102, although it may extend throughout the entire thickness of the body. The exterior mercurous layer may comprise a mercury amalgam formed by contacting mercury with the material of the tube. The tube preferably comprises either copper or aluminum, but may be of any suitable material which amalgamates with the mercury; the tube may be annealed if desired.

It has been found that while neither mercury or copper alone, for example, has a sufficiently low surface tension to promote dropwise condensation, a tube having a mercurous layer thereon promotes dropwise condensation at the mercurous surface. This phenomenon is not entirely understood and mercurous compounds such as mercury oxide or mercurous oxide may be formed on the exterior surface of the tube due to oxidation of the mercury or the mercurous amalgam in order to acheive the desired promotion of dropwise condensation. Accordingly, it should be understood that the term "mercurous surface" as used herein is intended to include an amalgam of mercury with the material of the heat exchange tube, such as copper, or such compounds as are formed at the surface of the tube which contribute to the promotion of dropwise condensation whether the mercury is in a univalent or a polyvalent state.

FIGURE 3 schematically illustrates a process for forming a mercuous layer on a heat exchange tube. A coating apparatus 110 comprises tank 111 having a first or cleaning section 112 and a second or coating section 113. A partition wall 122 separates cleaning section 112 from coating section 113. A heat exchange tube 33 to be treated in accordance with this invention may be passed through straightening rollers 120 into cleaning section 112 of the coating apparatus. Cleaning section 112 is refilled with an appropriate cleaning agent, the composition of which depends upon the material of the tube to be cleaned. For copper tubes an oxidizing acid such as dilude nitric or dilute sulfuric acid is a satisfactory cleaning agent. Annular gaskets 114 and 115 composed of a suitable material such as Neoprene which is resistant to the cleaning agent are provided to retain the liquid cleaning agent in cleaning section 112 of the coating apparatus. The heat exchange tube is passed through gaskets 114 and 115 where the surface to be cleaned contacts and is cleaned by the cleaning agent.

Coating chamber 113 is provided with annular gaskets 115 and 116 for retaining a quantity of mercury within the chamber. Heat exchange tube 33 which has been cleaned by passage through the cleaning chambers is then passed through coating chamber 113 where the cleaned surface is contacted by liquid mercury. The tube is then passed through gasket 116 which is provided with an annular coil spring 117 to compress an elongated wiper portion 123 of the gasket in order to wipe the mercury into the surface of the heat exchange tube. The mercury then amalgamates with the material of the heat exchange tube to form an amalgam on the surface thereof.

It will be understood that the particular process herein described for coating heat exchange tubes 33 is merely illustrative of one method of forming a mercury amalgam on the surface of the tube and other processes such as vapor diffusion of the mercury into the body of the tube may be used instead. Any process which forms a mercury amalgam on at least the exterior of the tube is statisfactory for the purposes of this invention.

While this invention has been described with reference to a preferred embodiment thereof, wherein a heat exchange tube is exteriorly coated or otherwise provided with a mercury amalgam on the condensing surface thereof, it will be understood that if it is desired to condense on an interior surface of the tube, the tube would be provided with a mercurous interior instead. It should also be understood that any body such as a flat or corrugated plate having a surface on which it is desired to provide dropwise condensation may be similarly provided with a mercurous surface within the scope of this invention.

In operation, it has been found that a mercurous surface of a heat exchange tube or other member is not only efficient in promoting dropwise condensation, thereby exhibiting greatly enhanced heat transfer and condensing efficiency, but in addition the mercurous surface has been found to be relatively permanent. Previously known materials such as oleic acid form merely a mechanical attachment of the condensing surface to which they are applied and consequently, while they promote dropwise condensation for a short time, these materials are readily stripped from the condensing surface in operation, eventually resulting in either film type condensation or mixed film and drop condensation which degrades the condensing efficiency of the apparatus. In contrast to these materials, the mercurous coating of the present invention is similar to a chemical bond possibly due to amalgamation of mercury with the metal of the heat exchange tube. This results in a relatively permanent bond between the mercurous coating and the condenser body which provides a condensing surface which promotes dropwise condensation over a relatively long period of use. For this reason, the condensing efficiency of the condenser constructed in accordance with this invention is relatively high and the condenser may be substantially smaller for a given application.

In addition, since the rate of heat transfer of a condenser having a mercurous coating thereon is relatively high, the temperature differential required for proper condensing may be relatively lower than with other types of condenser surfaces. Consequently, the cold surface of the condenser may be relatively warmer or in other words, relatively warmer cooling water may be employed or relatively less cooling water need be used to provide the desired amount of condensing.

Any mercury amalgamable metal may be treated in accordance with this invention to provide a mercurous condensing surface and it will be understood that this invention is not limited to copper condensing bodies. It will also be understood that this invention may be utilized to promote dropwise condensation in other refrigeration systems such as centrifugal or reciprocating refrigeration systems utilizing halogenated hydrocarbon refrigerants. Likewise, the invention may be applied to promoting efficient condensation of steam or other vapors such as in steam turbine condensers and steam heating or power plants.

This invention is not limited to the described preferred embodiment thereof, but may be otherwise practiced within the scope of the following claims.

We claim:

1. In an absorption refrigeration machine comprising an evaporator section, an absorber section, a generator section and a condenser section, and means interconnecting said sections to form a refrigeration system, the improvement comprising said condenser section including a plurality of heat exchange tubes each having an exterior mercurous surface thereon, and means to pass cooling fluid through said heat exchange tubes to cool and condense refrigerant on said exterior mercurous surface thereof, said mercurous surface serving to promote dropwise condensation of refrigerant thereon to improve the efficiency of said condenser section.

2. A condenser for condensing a vapor to a liquid comprising a hollow heat exchange tube, means to pass a condensible vapor over the exterior surface of said hollow heat exchange tube, means to pass a cooling fluid through the interior of said hollow heat exchange tube to absorb latent heat of vaporization from said condensible vapor by passage of heat from said vapor through said heat exchange tube to said cooling fluid on the interior thereof, and means to promote dropwise condensation of said vapor on the exterior of said tube to reduce the thermal resistance to passage of the heat to said cooling fluid comprising a mercury amalgam on the exterior surface of said heat exchange tube.

3. In a method of condensing a vapor to a liquid, the steps consisting of contacting the vapor to be condensed with a mercurous surface carried by a heat exchange body, cooling said mercurous surface to promote dropwise condensation of said vapor on said mercurous surface, and draining said mercurous surface of condensed vapor to provide surface for more condensation to take place.

References Cited by the Examiner

UNITED STATES PATENTS

| | | | |
|---|---|---|---|
| 453,882 | 6/91 | Draper et al. | 117—131 |
| 509,209 | 11/93 | Draper | 117—131 |
| 1,792,784 | 2/31 | Trent. | |
| 1,995,361 | 3/35 | Nagle | 257—24 |
| 2,248,909 | 6/41 | Russell | 165—133 |
| 2,338,223 | 1/44 | Anderson | 165—133 X |
| 2,469,729 | 5/49 | Hunter | 165—1 |
| 2,772,540 | 12/56 | Vierkotter | 62—64 |
| 2,918,807 | 12/59 | Leonard | 62—476 |

ROBERT A. O'LEARY, *Primary Examiner.*

EDWARD J. MICHAEL, *Examiner.*